UNITED STATES PATENT OFFICE.

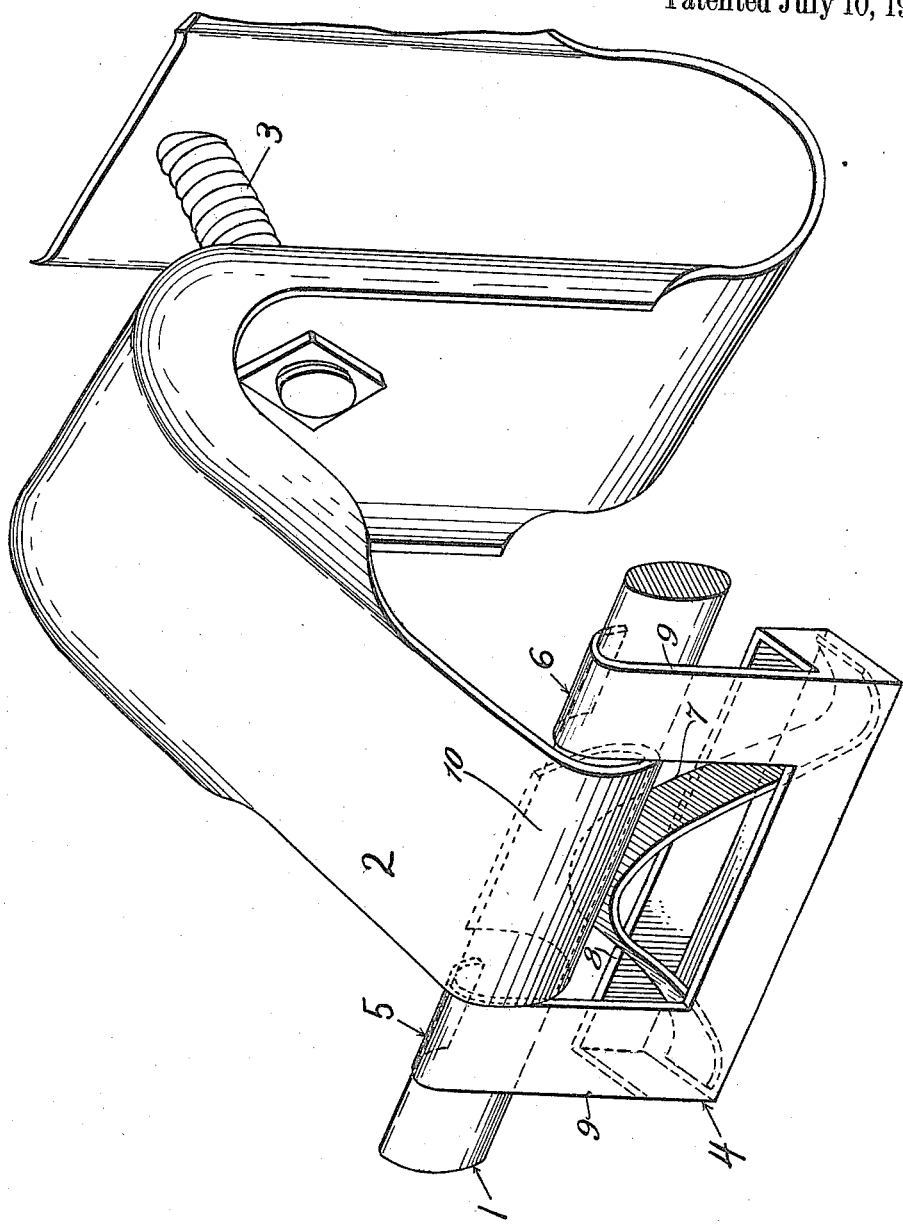

WALTER S. GRAFFAM, OF NORTHAMPTON, MASSACHUSETTS.

ANTIRATTLER FOR AUTOMOBILES.

1,232,678. Specification of Letters Patent. Patented July 10, 1917.

Application filed January 20, 1916. Serial No. 73,098.

*To all whom it may concern:*

Be it known that I, WALTER S. GRAFFAM, a citizen of the United States, residing at Northampton, in the county of Hampshire and State of Massachusetts, have invented a new and useful Antirattler for Automobiles, of which the following is a specification.

My invention relates to improvements in anti-rattlers for automobiles in which a spring, held within a hollow rectangular holder, presses against the brake rod support of an automobile in such a manner as to force the brake rod firmly against the side of its bearing in its support.

The objects of my improvement are, first, to provide a spring tension on the brake rod in such a manner as to hold it against its support with sufficient force to prevent vibration and consequent rattling; second, to permit of the free lateral movement of the brake rod in its support; third, to provide an anti-rattler which can be applied to the brake rod and its support without the use of tools and without removing the brake rod support from the automobile; and fourth, to provide an anti-rattler which will not necessitate the substitution of any other design of brake rod support in the place of that which is usually supplied with the automobile by the manufacturer.

I attain these objects by the device illustrated and set forth in the accompanying drawing in which—

The figure is a perspective view of a brake rod and its support with my invention applied thereto, said brake rod being shown partly in section and said support being broken away.

Similar figures refer to similar parts throughout the drawing.

The brake rod, 1, and the brake rod support, 2, are parts of an automobile, the brake rod support 2 being clamped to the rear radius rod of the automobile by means of the bolt 3. The spring holder 4 consists of a hollow rectangular body portion 8 open at the top and having two upwardly extending arms 9 terminating at their upper ends in hooks 5 and 6 which engage the brake rod 1 on opposite sides of the brake rod support 2. A flat U-shaped steel spring is interposed between the brake rod support 2 and the body portion 8 of the spring holder 4, with its opposite ends bearing against the bottom of said body portion and its central portion bearing against the under side of the bearing 10 of said brake rod support, thus causing the hooks 5 and 6 to press firmly against the brake rod 1, in turn forcing the brake rod 1 firmly against the bottom of its bearing in its support 2, thus preventing the brake rod 1 from vibrating or rattling in its support 2.

I am aware that prior to my invention other anti-rattling devices have been made in which the brake rod is held from vibrating in its support by means of springs. I therefore do not claim such a combination broadly.

I claim:

1. In combination, a support, a rod slidably mounted thereon, a spring holder consisting of a body portion and a pair of arms extending upwardly therefrom and detachably engaging said rod on opposite sides of said support, and a spring separate from said body portion interposed between said body portion and said support.

2. In combination, a support, a rod slidably mounted thereon, a spring holder consisting of a body portion and a pair of arms extending upwardly therefrom and terminating in hooks adapted to engage said rod on opposite sides of said support, and a spring separate from said body portion and interposed between said body portion and said support.

3. In combination, a support, a rod slidably mounted thereon, a spring holder consisting of a hollow rectangular body portion open at the top and a pair of arms extending upwardly therefrom and terminating in hooks adapted to engage said rod on opposite sides of said support, and a U-shaped flat spring interposed between said body portion and said support, with its opposite ends projecting into said body portion and resting on the bottom thereof adjacent the opposite ends of said body portion and with the central portion of said spring bearing against said support.

W. S. GRAFFAM.

Witnesses:
 I. T. GRAFFAM,
 J. C. GRAFFAM.

Copies of this patent may be obtained for five cents each, by addressing the "Commissioner of Patents, Washington, D. C."